(12) United States Patent
Fox

(10) Patent No.: US 8,146,733 B2
(45) Date of Patent: Apr. 3, 2012

(54) IDLER ROLL SEAL

(75) Inventor: Paul K. Fox, Greensburg, PA (US)

(73) Assignee: United States Steel Corporation, Pittsburgh, PA (US)

( * ) Notice: Subject to any disclaimer, the term of this patent is extended or adjusted under 35 U.S.C. 154(b) by 83 days.

(21) Appl. No.: 12/844,154

(22) Filed: Jul. 27, 2010

(65) Prior Publication Data
US 2012/0024658 A1 Feb. 2, 2012

(51) Int. Cl.
*B65G 39/10* (2006.01)
(52) U.S. Cl. ............... 198/780; 193/37; 492/47; 492/48
(58) Field of Classification Search ............... 193/37; 198/780–791; 492/47, 48
See application file for complete search history.

(56) References Cited

U.S. PATENT DOCUMENTS

| 4,267,920 | A | * | 5/1981 | Olschewski et al. | 198/842 |
| 4,272,135 | A | * | 6/1981 | Hamblin et al. | 384/482 |
| 4,315,566 | A | * | 2/1982 | Greener et al. | 193/37 |
| 5,261,528 | A | * | 11/1993 | Bouchal | 198/842 |
| 5,373,603 | A | * | 12/1994 | Stegens | 15/179 |
| 5,944,161 | A | * | 8/1999 | Sealey | 193/37 |
| 6,234,293 | B1 | * | 5/2001 | Fasoli | 193/37 |

FOREIGN PATENT DOCUMENTS
EP 112026 A1 * 6/1984
* cited by examiner

*Primary Examiner* — Mark A Deuble
(74) *Attorney, Agent, or Firm* — McNees Wallace & Nurick LLC; Edward H. Jones, Jr.

(57) ABSTRACT

A contact seal to prevent contamination from fouling a conveyor idler roll, the roll generally comprising a rotatable cylinder, at least one internal bearing assembly, and a fixed axle. A disc of thermoplastic polymer or similarly resilient material is adhesively attached preferentially to an outboard end cap of the idler roll to seal out contamination. A circular aperture through the disc allows the attached seal to rotate about the idler axle. At least one ring of felt or other porous material is adhesively attached to the disc circumferentially to the aperture to filter out contamination when the ring is in frictional contact with the roll end cap. The seal is preferentially divided along the longitudinal axis of the disc to form two interlocking semicircular half-pieces that are snapped together circumferentially about the idler axle so that no disassembly or modification of the idler is required to adhesively attach the seal.

16 Claims, 8 Drawing Sheets

IDLER ROLL SEAL

TECHNICAL FIELD OF THE INVENTION

The application generally relates to mechanical seals for bearing assemblies. The application relates more specifically to a contact seal for an idler roller in a conveyor system typically used in industrial manufacturing and mining applications, for preventing contaminants from infiltrating and fouling the idler roll.

BACKGROUND OF THE INVENTION

In a belt conveyor line of the type typically used for the bulk handling of raw materials, a continuously moving looped belt and its load are supported by a system of idlers. The idler system comprises idler rolls and supporting brackets, both typically fashioned from steel. Each idler roll generally comprises a roll cylinder having two end caps at each opposite end of the roll cylinder, with the cylinder freely rotating about a fixed axle, the axle being affixed at each end to a supporting bracket, and at least one internal bearing assembly positioned inside the roll cylinder to support the roll cylinder as it rotates about the fixed axle. Three idler rolls aligned end-to-end and angled in a wide "U" or trough shape and supported by brackets attached to a cradle-like frame typically comprise one idler set. The idlers are positioned in such a way as to allow the moving belt with its load to rest directly on the freely rotating rolls so that the belt can travel the entire length of the conveyor line. Idlers are often required to perform in harsh environments, such as those incident to the mining and steelmaking industries. Bulk handling operations that involve raw materials such as coal, coke, and iron ore pellets can subject idlers to excessive moisture, abrasive particulates, contaminants and corrosive chemicals. Such harsh environmental conditions can adversely affect idler components. Exposure to contaminants can cause idler roll cylinders to seize up, corrode, and/or prematurely wear out.

Idler failure is most often caused by water, waterborne contaminants, airborne contaminants and combinations thereof seeping through a circumferential gap at the end cap located at each end of a roll cylinder. The circumferential gap is created at the interface of an axle and a typically stationary outer contact seal with an aperture at the end cap through which the axle and stationary outer contact seal extend. The gap permits the roll cylinder to freely rotate about the fixed axle. Contamination infiltrating the roll via the circumferential gap can result in bearing assembly seizure or roll cylinder corrosion. In addition, the constant vibration to which idlers are often exposed increases the likelihood of contaminants working their way through the circumferential gap and infiltrating the roll. A three-roll idler set will typically have a total of six bearing assemblies, one internal bearing assembly at each end of each of the three rolls. Failure of just one bearing assembly or corrosion of just one roll cylinder can necessitate replacement of the entire idler set. Bearing failure will most often cause the roll to seize and become stationary. A conveyor belt traveling over a stationary roll eventually will wear a flat spot on the roll at the point of contact. Too many stationary rolls will cause drag on the belt, shortening its life. Idlers wear out at different rates based on the conditions to which they are exposed. In the harshest environments, idlers might have to be replaced as often as every four months, while in benign environments, idlers might in rare instances last for up to twenty years.

The two outer rolls of an idler set, called the wing rolls, are known to fail at a rate significantly greater than the center roll, due to the greater exposure of the wing rolls to the environment, in contrast to the protection afforded to the center roll by the conveyor belt overhead. Thus, the need to mitigate/eliminate infiltration by contaminants is especially critical for the wing rolls, with the outboard end of each wing roll having the greatest environmental exposure.

Mitigating and/or eliminating contamination from infiltrating and fouling idler rolls by use of a cost-effective seal will permit increased efficiency in bearing assembly operation, extend idler life, reduce roll failures, improve conveyor belt life, and significantly reduce idler maintenance costs.

Idler roll seals are known in the art. Generally, such seals are of the labyrinth type, the contact type, or a combination of both. Labyrinth seals employ a tortuous network of passages between the contaminating environment and the idler roll bearing assembly. Contaminants can only infiltrate the bearing assembly by traversing the tortuous path. In contrast, contact seals employ a physical barrier placed in direct contact with the end cap of the idler roll to act as a shield between the bearing assembly and the infiltrating contaminants. Lastly, combination seals combine features of the labyrinth and contact seals to enhance the ability of the seal to deter entry of contaminants into the bearing assembly area. In all of these instances, however, either the seal is part of the inner workings of the idler roll, requiring expensive installation of the seal during roll manufacture, or the seal is externally applied directly to an existing roll, but only after time consuming disassembly of the roll from its bracket. Thus the need for an effective, inexpensive, durable, and easily fabricated and installed idler roll seal for retrofitting existing idlers and for installation on new idlers without the need for time consuming and costly alteration of the rolls.

SUMMARY OF THE INVENTION

The present invention is an effective, inexpensive, durable, and easily fabricated and installed idler roll seal for retrofitting existing idler rolls, with each idler roll generally comprising a rotatable cylinder having two opposite ends, each end having an end cap, a fixed axle about which the cylinder rotates, and at least one bearing assembly positioned inside the cylinder for rotatably supporting the cylinder about the fixed axle.

The invention comprises a disc of rigid polymer or similarly resilient material that is attached preferentially to the outboard end cap of an idler roll to form a protective seal against environmental contamination. A circular aperture through the disc allows the seal when attached to freely rotate about the idler axle with the roll cylinder. One side of the disc—the bottom or roll-facing side—has a raised, flat rim around the periphery of the disc to provide a surface for adhesively attaching the disc to the end cap of the roll. At least one ring of porous material is attached to the bottom of the disc circumferentially about the aperture to filter out contaminants by providing a snug fit when the porous ring is in frictional contact with the end cap of the roll.

The disc is divided substantially diametrally to create two opposing semicircular half-pieces to facilitate attachment of the seal to the end cap of the idler roll. The half-pieces snap together along cooperating interfaces along opposed diametral faces of the disc. By dividing the disc into two halves, the seal can be easily affixed to the end cap of an idler roll circumferentially about the axle without the need for disassembling or modifying the roll and its supporting brackets. A lip is disposed along the edge of each half and its respective connecting interface, such that the two lips overlap with each other when the two halves are snapped together, thus preventing infiltration of contaminants along the part line where the two halves fit together.

One embodiment of the present invention discloses a seal for preventing contaminants from infiltrating and fouling a conveyor idler roll. The seal includes a disc of resilient material attachable to an end cap of the idler roll. The disc includes a top face, a bottom face, and a circular aperture through the center. The aperture is at least large enough to permit the disc to freely rotate about a fixed axle of the idler roll when the disc is attached to the end cap of the idler roll. The disc further includes a raised rim located around the periphery of the bottom face of the disc to provide a surface for attaching the disc to the end cap of the idler roll; and a ring of porous material attached to the bottom face of the disc circumferentially to the aperture to filter out contaminants by providing the seal with a snug fit against the end cap of the idler roll when the seal is attached to the idler roll.

In another embodiment of the present invention a conveyor idler roll is disclosed. The conveyor idler roll includes a rotatable cylinder having opposed ends, an end cap over each of the opposed ends of the cylinder, the end cap having a circumferential opening; a fixed axle extending through the cylinder and the end cap openings about which the cylinder rotates; at least one bearing positioned inside the cylinder to support the cylinder about the fixed axle as the cylinder rotates; a seal for preventing contaminants from infiltrating and fouling the idler roll, the seal further including a disc of resilient material attachable to an end cap of the idler roll. The disc includes a top face, a bottom face, and a circular aperture through the center. The aperture is large enough to permit the disc to freely rotate about a fixed axle of the idler roll when the disc is attached to the end cap of the idler roll. The disc further includes a raised rim located around the periphery of the bottom face of the disc to provide a surface for attaching the disc to the end cap of the idler roll. The disc also includes a ring of porous material attached to the bottom face of the disc circumferentially to the aperture to filter out contaminants by providing the seal with a snug fit against the end cap of the idler roll when the seal is attached.

In yet another embodiment of the present invention, a conveyer idler roll includes a rotatable cylinder comprising opposed ends; an end cap over each of the opposed ends of the cylinder, the end cap comprising a circumferential opening; a fixed axle extending through the cylinder and the end cap openings about which the cylinder rotates; a bearing positioned inside the cylinder to support the cylinder about the fixed axle as the cylinder rotates; a first seal for preventing contaminants from infiltrating and fouling the idler roller selected from the group consisting of labyrinth seals and contact seals; a second seal for preventing contaminants from infiltrating and fouling the idler roll through a circumferential gap located at an interface between the axle and a typically stationary outer first contact seal and the end cap aperture. The second seal further includes a disc of resilient material attachable to an end cap of the idler roll, the disc comprising a top face, a bottom face, and a circular aperture through the center thereof, the aperture being at least large enough to permit the disc to freely rotate about a fixed axle of the idler roll when the disc is attached to the end cap of the idler roll, the disc further comprising a raised rim located around the periphery of the bottom face of the disc to provide a surface for attaching the disc to the end cap of the idler roll; and a ring of porous material attached to the bottom face of the disc circumferentially to the aperture to filter out contaminants by providing the seal with a snug fit against the end cap of the idler roll when the seal is attached.

The disclosed idler roll seal is an effective, inexpensive, durable, and easily fabricated and installed idler roll seal for application on idlers of the kind that can be found in conveyor systems typically used in the mining and steelmaking industries. The present invention has been found to provide excellent protection of idler rolls while performing in harsh environments such as handling and storage areas for coal, coke, and iron ore pellets.

The present invention is designed to cover and seal the slight circumferential gap at the end cap of a roll needed to permit the roll cylinder to freely rotate about the fixed axle. The circumferential gap is the path by which water, water borne contaminants and/or airborne contaminants can infiltrate and foul the internal components of the idler roll with damaging results. The present invention is a contact seal that serves as a physical barrier placed in direct contact with the end cap of the idler roll to act as a shield between the idler roll's internal components and any external contamination. The design of the invention is such that the seal can be easily fabricated to fit idler rolls of varying types and sizes.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The present invention will become more fully understood from the detailed description of the preferred embodiment and the accompanying drawings which are given by way of illustration only, and are in no way intended to limit the invention.

DESCRIPTION OF THE PREFERRED EMBODIMENT

Figure 1:
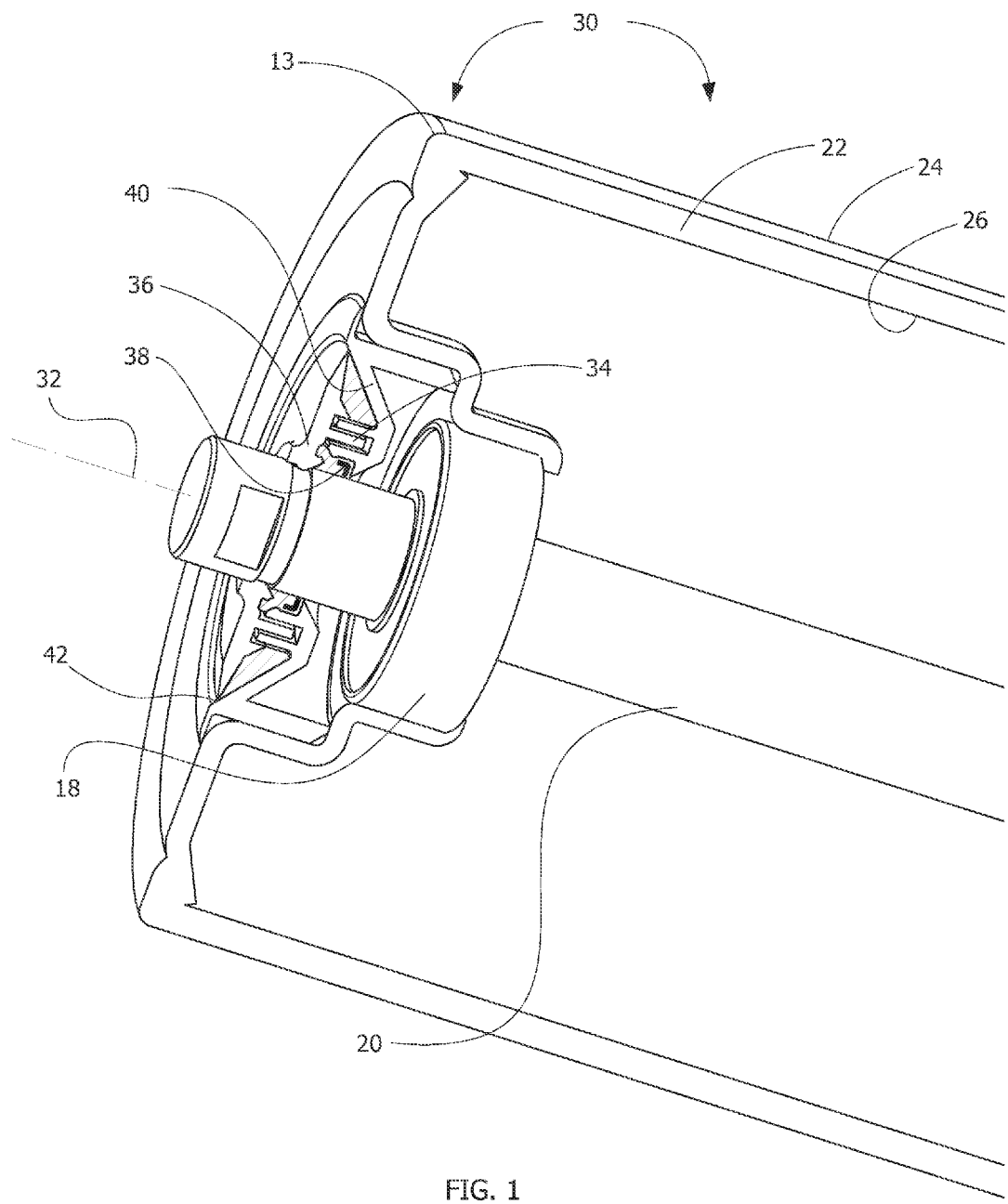
FIG. 1 is a partial cut-away view of an exemplary prior art idler roll of a conveyor system.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

An axle or shaft 20 is supported at a desired location and orientation on a carrier. The shaft 20 does not rotate but is fixed relative to the carrier. (i.e., stationary). Idler roll 30 includes at least one set of bearings housed in a bearing assembly 18 and a cylindrical shell 22 with an exterior surface 24, an interior surface 26 and opposing ends 28. Exterior surface 24 is the portion of the idler roll 30 that engages and thus supports a conveyor belt within the conveyor belt system. Interior surface 26 defines a hollow interior of the shell 22. At each end 28 of shell 22, interior surface 26 may have a slightly greater diameter that provides an annular recess at end 28. Shaft 20 extends through the hollow interior of shell 22. Shell 22 is centered on a central axis 32 and supported for rotation thereon relative to the shaft 20.

Referring to prior art FIG. 1, an idler roll 30 generally comprises a roll cylinder shell 22 having end caps 13 attached at each opposite end of roll cylinder shell 22, with the roll cylinder shell 22 freely rotating about a fixed axle shaft 20. Axle shaft 20 may be affixed at each end to a supporting bracket, and at least one internal bearing assembly 18 positioned inside roll cylinder shell 22 to support the roll cylinder shell 22 as it rotates about fixed axle shaft 20, with idler roll 30 typically having two internal bearing assemblies 18, one bearing assembly 18 positioned inside each end of the roll cylinder shell 22.

Exemplary idler roll bearing assembly 18 may be part of an idler roll 30 in a conveyor belt system. The conveyor belt system includes a belt 14 (see, e.g., FIG. 6) that is supported by a plurality of carriers. Each carrier within the conveyor belt system typically includes a supporting bracket (not shown) that traverses the conveyor belt 14 and journals three idler rolls 30 assembled end-to-end. An intermediate idler roll 30 is typically disposed horizontally while the outer two idler rolls 30 are slightly canted at an upwardly inclined angle relative to the horizontal plane, to provide a trough for keeping a load centered on the conveyor belt 14. The carrier and thus the system may contain a large number of idler roll bearing assemblies 18.

Idler roll 30 optionally may include more seals internally or externally of cylinder shell 22 relative to end caps 13. In the exemplary embodiment of FIG. 1, a radial labyrinth seal 34 may be disposed between bearing assembly 18 and a stationary outer first contact seal 36. A polymeric seal 38, made from a polymeric substance, e.g., nitrile, may also be applied over shaft 20 between radial labyrinth seal 34 and shaft 20. A flinger seal 40 may also be employed to seal out contaminants. In an alternate embodiment, idler roll 30 may be provided with one or more of the seals 34, 36, 38 or 40, or with no internal seals.

Even with the provision of seals 34, 36, 38 and 40 on idler roll 30, a gap 42 circumferential to axle 20 and stationary outer first contact seal 36 may be present at end cap 13 of idler roll 30. Gap 42 is needed to permit idler roll 30 to freely rotate about fixed axle 20. A contact seal 1 of the present disclosure is designed to cover and seal the slight circumferential gap 42 at end cap 13. The circumferential gap 42 provides a path by which water, water borne contaminants and/or airborne contaminants can infiltrate and foul the internal components of the idler roll with damaging results. Contact seal 1 provides a physical barrier that is placed in direct contact with end cap 13 of idler roll 30 to act as a shield between the idler roll's internal components and any external contamination. The design of the contact seal 1 is such that contact seal 1 can be easily fabricated to fit idler rolls 30 of varying types and sizes.

Referring next to FIGS. 2-5, the roll contact seal 1 is generally disc shaped and may be preferably fabricated from a resilient material, such as rigid polymer. In at least one exemplary embodiment, a thermoplastic polymer, Polystone® Matrox™ High Performance Polymer, an ultrahigh molecular weight polyethylene having a molecular weight between 2 and 6 million, may be used to provide a low friction, high impact surface that resists wear, chemical attack, and thermal extremes. Roll contact seal 1 may be fabricated in a machine shop capable of machining plastics and can be fashioned to accommodate any size idler roll 30. Roll contact seal 1 has a circular aperture 2 just large enough to allow roll contact seal 1 to freely rotate about idler axle 20. Roll contact seal 1 also includes a raised rim 3, preferably flat, around the periphery of a first side or roll-facing side 1a of roll contact seal 1, to provide a surface to apply an adhesive for adhesively attaching roll contact seal 1 to end cap 13 of idler roll 30. At least one ring 4 of a porous material, preferably felt or the like, is attached to first side 1a of roll contact seal 1. Ring 4 is disposed circumferentially about aperture 2 to filter out contaminants by providing a snug fit when ring 4 is in frictional contact with end cap 13. Ring 4 is sufficiently thick to effectively seal out contaminants, but not so thick as to prevent roll contact seal 1 from freely rotating about idler axle 20. Also, when roll contact seal 1 is affixed to an end cap 13 of idler roll 30, the outer circumference 4a of porous ring 4, and the inner circumference 3a of raised rim 3 are positioned to lie on either side of circumferential gap 42 of idler roll end cap 13 to provide sufficient space around circumferential gap 42. Care must be taken to ensure that porous ring 4 does not cover circumferential gap 42, otherwise the felt or other porous material comprising ring 4 will tend to draw water and other undesirable contaminants through the circumferential gap 42 and foul the inner workings of the idler roll 30 as a result of the natural wicking action of the porous ring 4.

Figure 3:
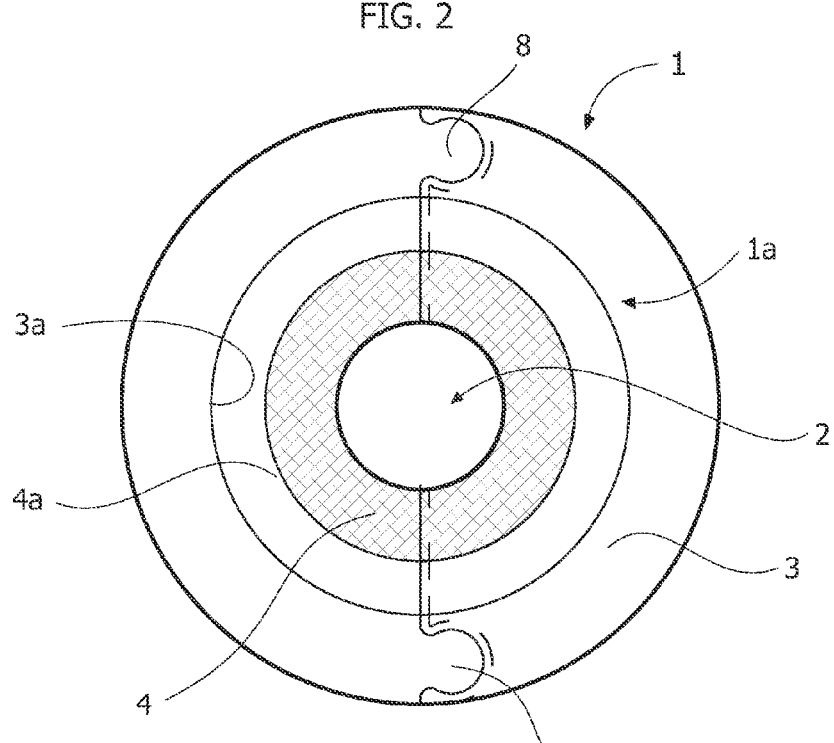
FIG. 3 is a view of the bottom face of the idler roll contact seal of FIG. 2 showing both semi-circular segments joined together.
Figure 4:
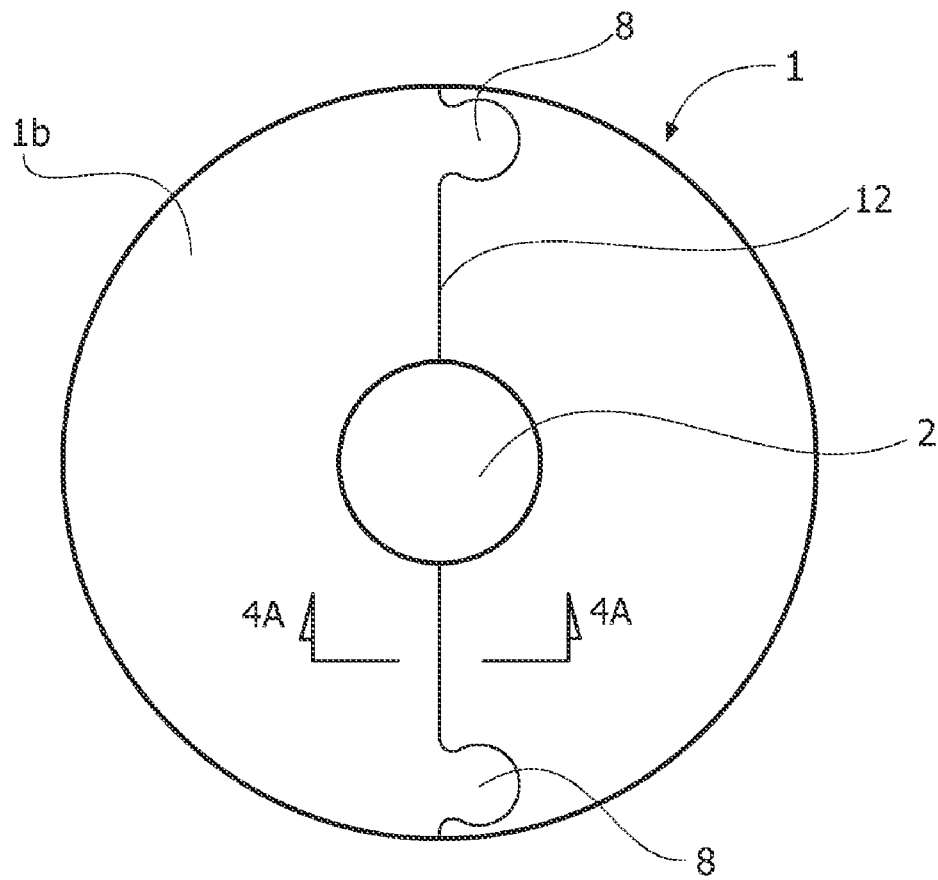
FIG. 4 is a view of the top face of the idler roll contact seal of FIG. 2.
Figure 4B:
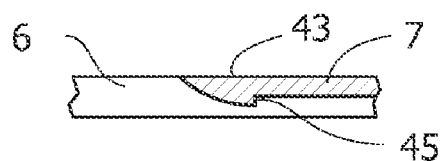
FIG. 4B shows an alternate embodiment of the cross-sectional view of FIG. 4A.
Figure 5:
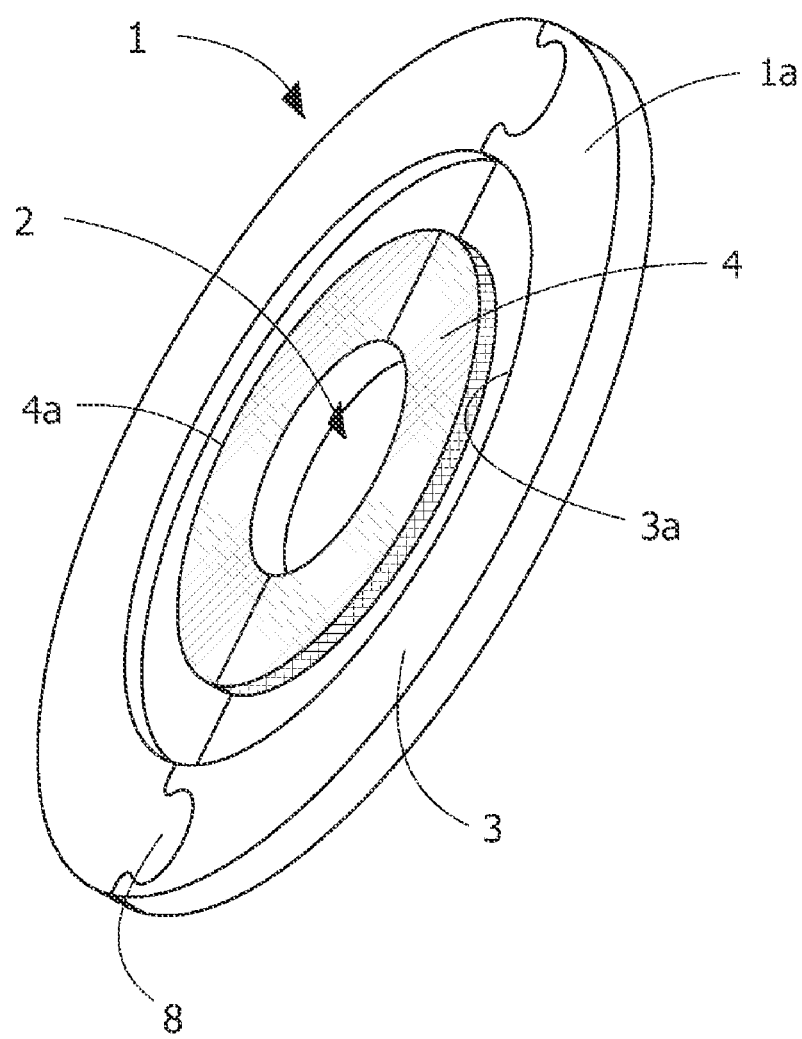
FIG. 5 is a perspective view of the bottom face of the idler roll contact seal of FIG. 2.

As illustrated in FIGS. 3, 4 and 5, to facilitate attachment of roll contact seal 1 to end cap 13 of idler roll 30, roll contact seal 1 may be divided along its diameter 5 into two substantially semicircular half-pieces 6, 7. In the exemplary embodiment, two half-pieces 6, 7 are joined together using any suitable joint. In the shown preferred embodiment, the half-pieces are joined using a dovetail joint around idler axle 20. A male connector 8 is situated along diametral edge of part line 12 of the first half-piece 6 and mated female connector 9 situated along the diametral edge of part line 12 of the second half-piece 7. Connectors 8 and 9 may be mated pairs of knobs and slots that allow half-pieces 6, 7 to easily snap together. It will be appreciated by those skilled in the art that one or more male connectors 8 and one or more female connectors 9 may be configured on each half-piece 6, 7, in corresponding pairs. It will also be appreciated that other suitable joints such as lap joints, mortise joints, etc. may also be used. In one example, FIG. 4B illustrates an interlocking pawl or detent 43 on one half-piece 7 that engages a groove 45 on other half-piece 6.

Figure 4A:
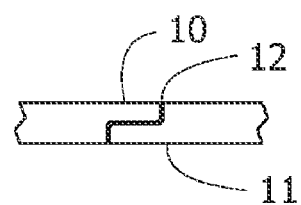
FIG. 4A is a cross-sectional view taken along lines 4A-4A in FIG. 4.

Referring next to FIG. 4A, to further seal out contamination, lips 10,11 are disposed along the part line 12 of each half-piece 10, 11 and its respective connecting means. Lips 10, 11 overlap, forming a lap joint when half-pieces 6, 7 are snapped together, thus mitigating the infiltration of contaminants along the part line 12 where half-pieces 6, 7 fit together.

Figure 2:
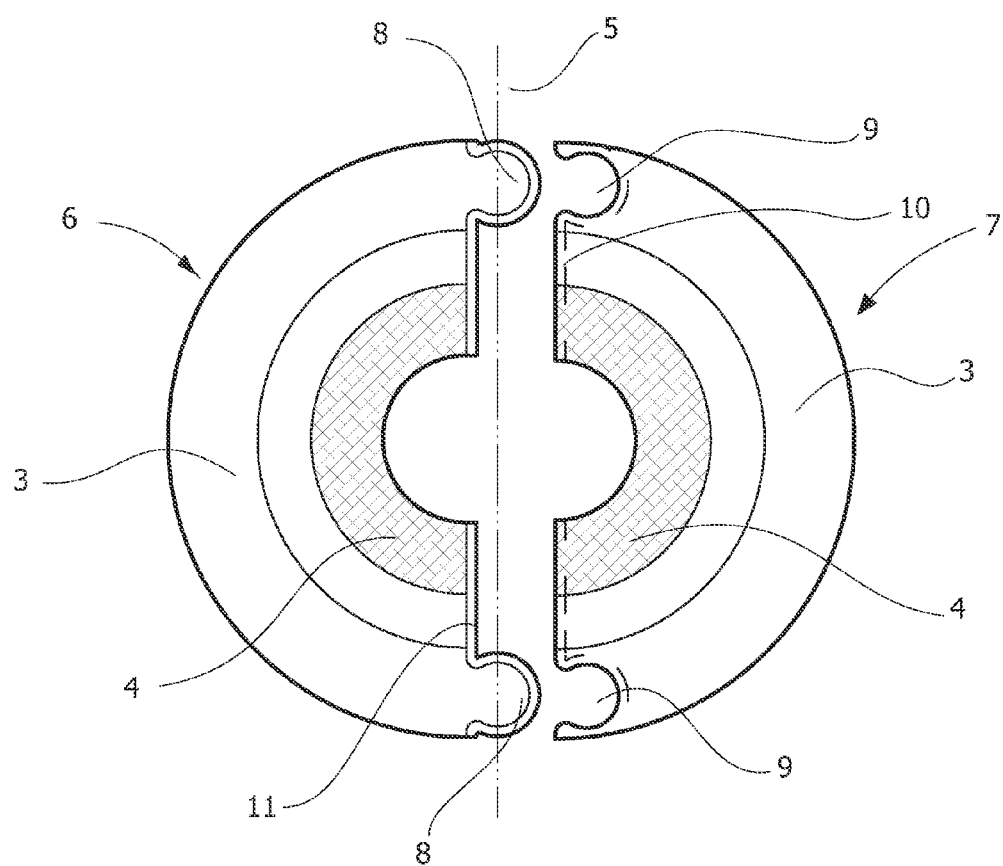
FIG. 2 is a view of the bottom face of one embodiment of an idler roll contact seal showing two semicircular segments separated.

FIG. 3 shows the bottom face of an idler roll seal 1 with both half-pieces 6, 7 joined by connecting means. FIG. 2 shows the same roll contact seal 1, only half-pieces 6, 7 are separated to facilitate attachment of the half-pieces to a roller end cap 13. FIG. 4 show the top face of the same roll contact seal 1, with the two half-pieces 6, 7 shown joined.

Referring next to FIG. 5 a side perspective is shown of roll contact seal 1 revealing the relative thickness of a typical embodiment of roll contact seal 1 in one exemplary embodiment. Roll contact seal 1 may have a thickness of 3/16 of an inch (in.) along the peripheral edge, with an overall diameter of 4 in., a center aperture of 1 in. to accommodate shaft 20, and porous ring 4 being between about 1 to 2 in. wide.

A suitably strong adhesive may be used to attach both the seal to the idler roll and the porous ring to the seal. Dow Corning® 732 Multi-Purpose Sealant has been found to hold up well under extreme temperatures and harsh contaminating conditions.

The seal is designed to snap into place about the roll cylinder axle 20. Adhesive is applied on raised rim 3 on the bottom cap of roll contact seal 1 in sufficient amount to insure that contaminants are effectively sealed out. The two half-pieces 6, 7 are then placed bottom face down so the adhesive comes in contact with the roller end cap 13. The two half-pieces are snapped together and adjusted into final position which is determined when the edge of the seal aperture is equidistant from the roller axle. Lastly, a bead of adhesive is applied along the part line 12 where the two half-pieces join as added insurance against infiltrating contamination. While an adhesive is preferred for joining roll contact seal 1 to end cap 13, any mechanical device for securing the seal to the end cap may be used in place of an adhesive.

Figure 6:
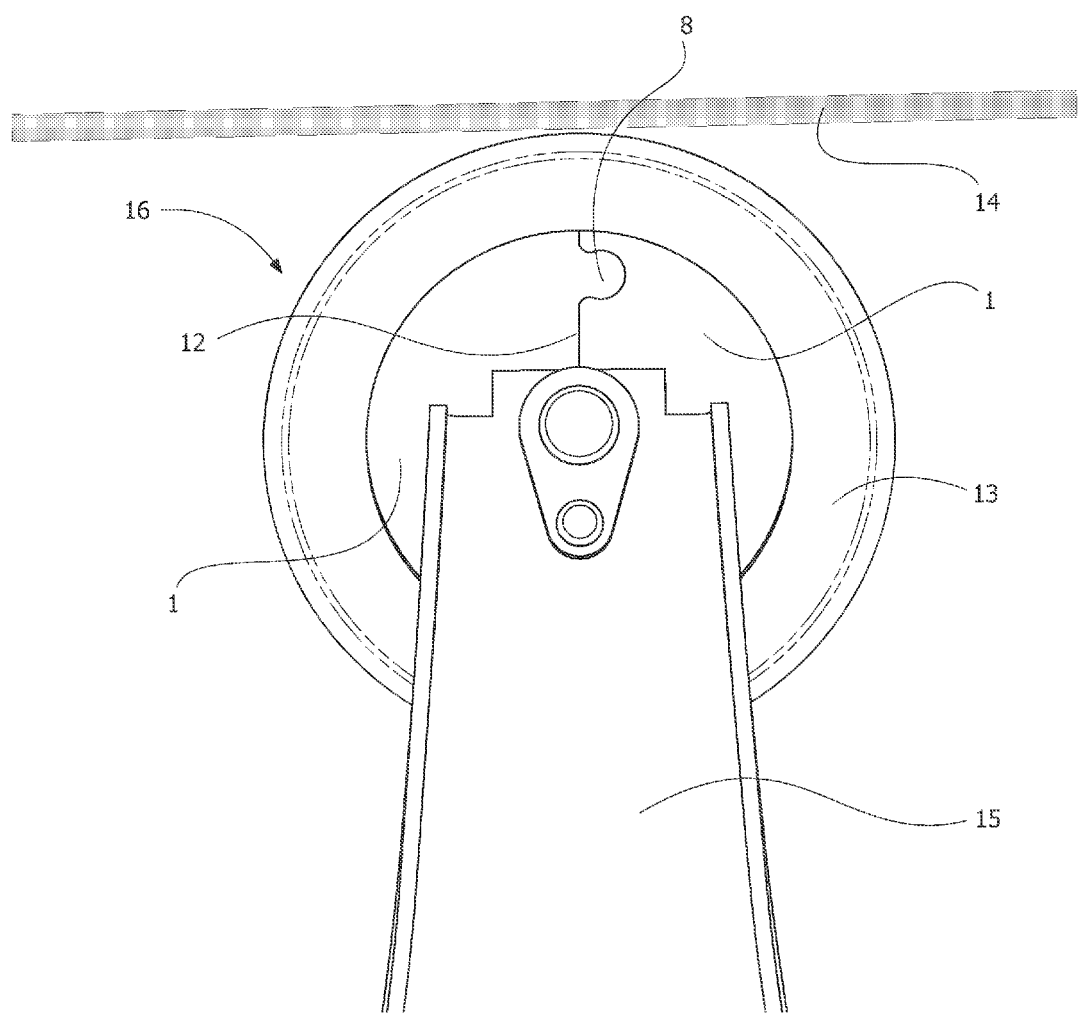
FIG. 6 is a partial side view of an exemplary conveyor assembly showing an exemplary idler roll contact seal attached to an idler roll end cap.

FIG. 6 is a side view of a section of a conveyor line showing a portion of a conveyor belt 14, an idler bracket arm 15, and the outboard end of an idler wing roll 16 showing an idler roll seal 1 attached to an idler roll end cap 13, with one roll seal connecting knob 8 visible.

Figure 7A:
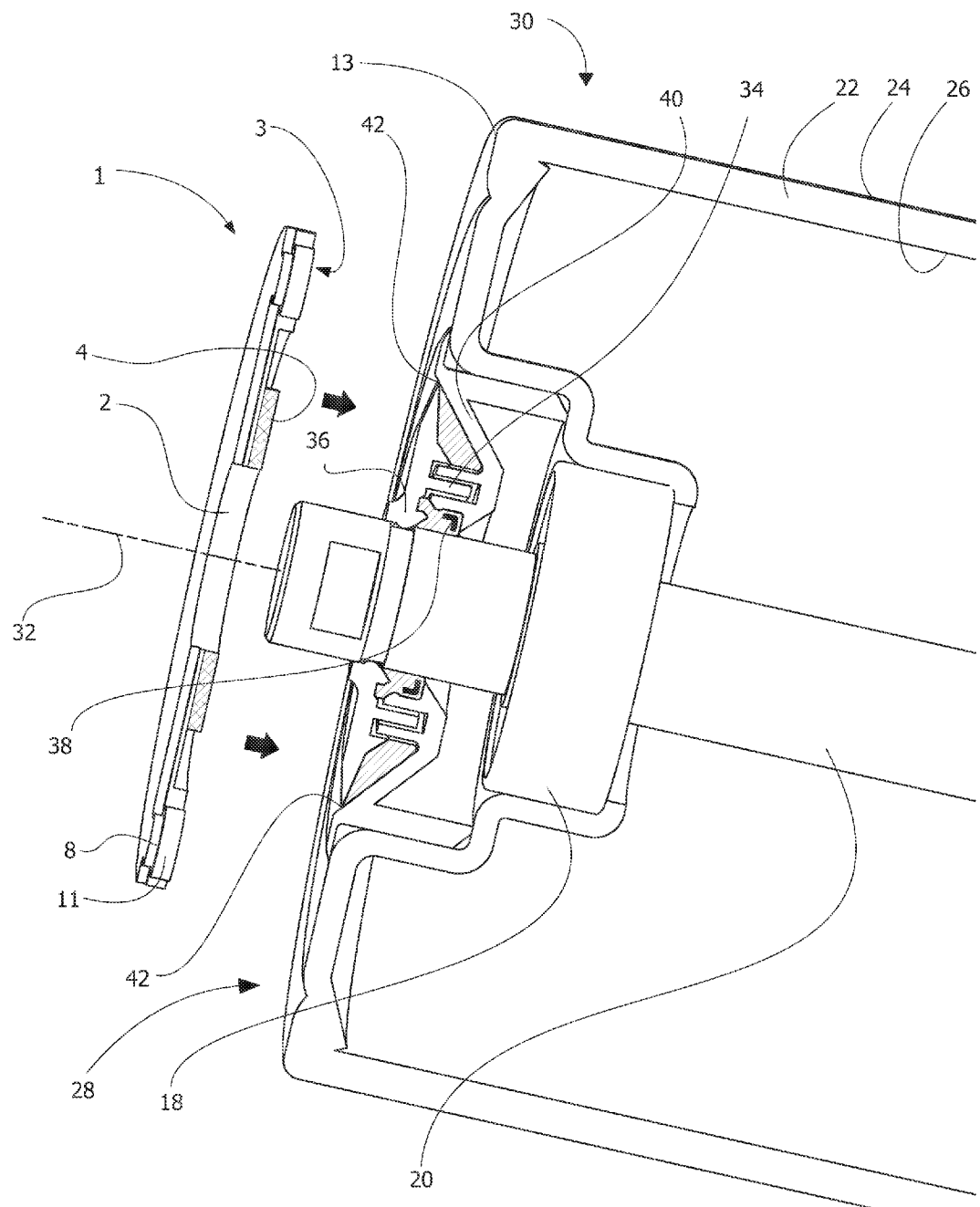
FIG. 7A illustrates a partial sectional view of an exemplary idler roll with an idler roll contact seal of the present invention offset from the idler roll.
Figure 7B:
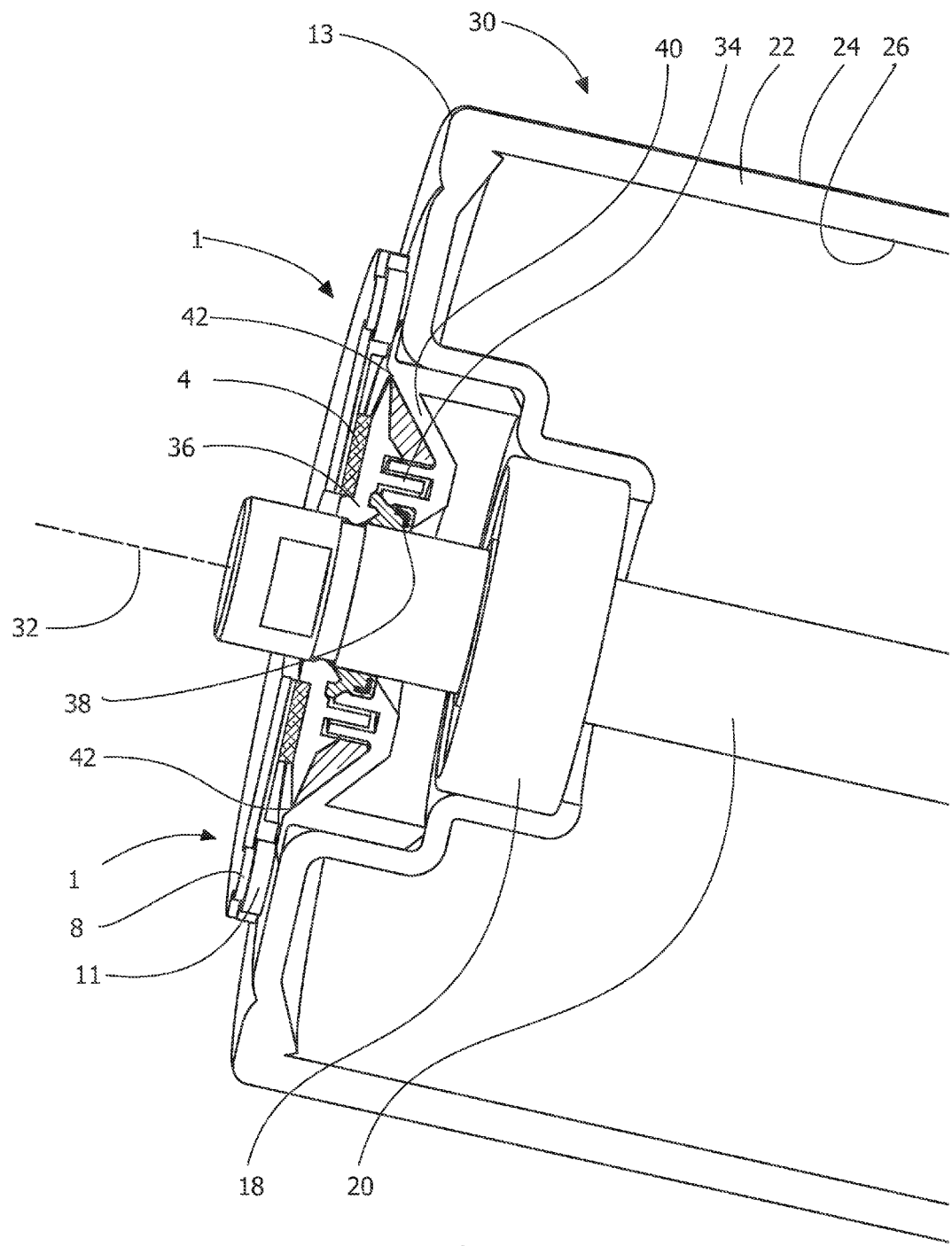
FIG. 7B illustrates a partial sectional, view of an exemplary idler roll with an idler roll contact seal of the present invention applied over the idler roll end cap.

FIGS. 7A and 7B illustrate a partial sectional view of an exemplary idler roll 30. FIG. 7A shows the idler roll contact seal 1 being applied as indicated by arrows. FIG. 7B shows the idler roll contact seal of the present invention applied over idler roll end 28 and shaft 20. This view shows the placement of roll contact seal 1 on idler roll 30 to seal the circumferential gap 42 at the interface of axle 20 and stationary outer first contact seal 36 and aperture at end cap through which the axle 20 and stationary outer first contact seal 36 extend. The remaining components show the same components of the prior art seal of FIG. 1, and it is noted that roll contact seal 1 may be used with or without seals 34, 36, 38 or 40, which are shown only to illustrate one commercially available idler roll.

Figure 8:
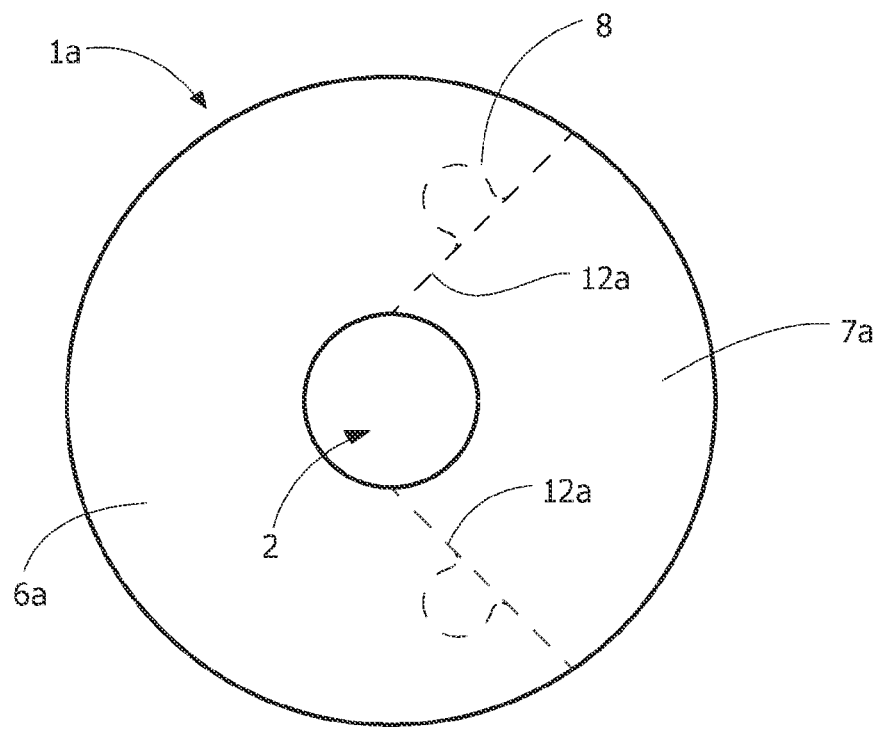
FIGS. 8 & 9 illustrate alternate embodiments of roll contact seals wherein the separation lines define sectors of a circle that are non-symmetrical.
Figure 9:
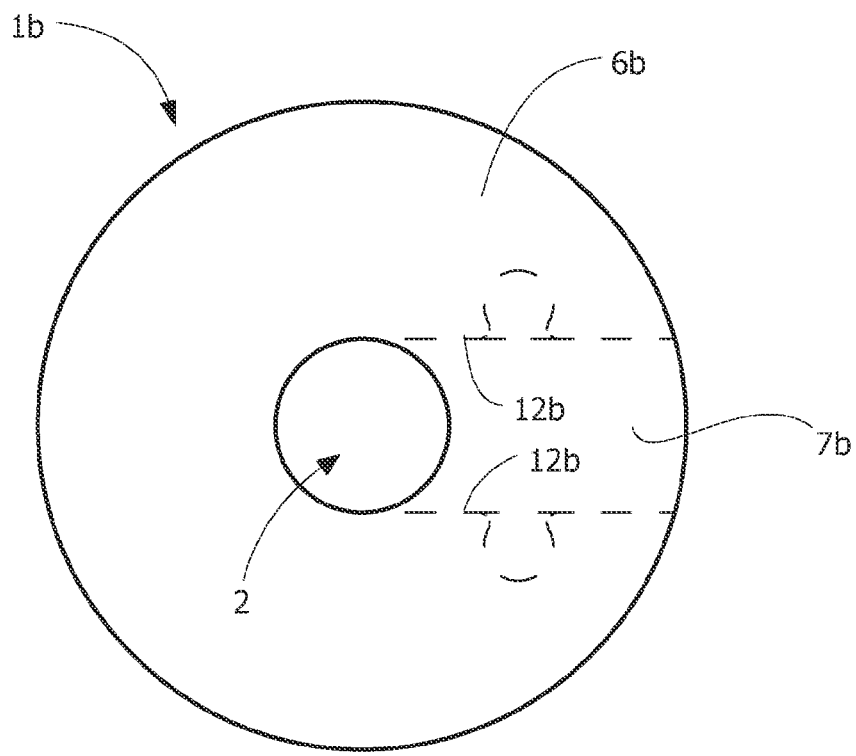

FIGS. 8 & 9 illustrate alternate embodiments of roll contact seal 1 which part line 12 may be configured slightly differently to define at least two portions or sectors 6a, 7a (FIG. 8) or 6b, 7b (FIG. 9) of a circular roll contact seal 1a (FIG. 8), 1b (FIG. 9) that are not two semi-circular half-pieces. E.g., roll contact seal 1a has sectors 6a, 7a defined by part lines 12a indicated by broken lines 12a that define sector 6a to cover approximately 280 degrees and sector 7a to cover about 80 degrees. Similarly, in FIG. 9, sector 6b is joined with sector 7b at part lines 12b extending tangentially from center aperture 2. In each instance, the sectors 6a, 7a, and 6b, 7b, may be applied to end cap 13 around shaft 20 without first having to disassemble idler roll 30 to replace roll contact seal 1a, 1b.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the idler roll contact seal as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

What is claimed is:

1. A seal for preventing contaminants from infiltrating and fouling a conveyor idler roll, the seal comprising:
    a disc of resilient material attachable to an end cap of the idler roll, the disc having a top face, a bottom face, and a circular aperture through the center thereof, the aperture being at least large enough to permit the disc to freely rotate about a fixed axle of the idler roll when the disc is attached to the end cap of the idler roll, the disc further having a raised rim located around the periphery of the bottom face of the disc to provide a surface for attaching the disc to the end cap of the idler roll; and
    at least one ring of porous material attached to the bottom face of the disc circumferentially to the aperture to filter out contaminants by providing the seal with a snug fit against the end cap of the idler roll when the seal is attached thereto;
    wherein the disc and the attached porous ring are divided along a part line of the disc to form two substantially semicircular half-pieces comprising a first half-piece having a diametral edge and a second half-piece having a diametral edge opposing the diametral edge of the first half-piece.

2. The seal as recited in claim 1, wherein the first half-piece is aligned and joined together with the second half-piece by a connector disposed along the diametral edge of the first half-piece and the diametral edge of the opposing second half-piece.

3. The seal as recited in claim 2, wherein the connector comprises a dovetail joint, the dovetail joint comprising at least two male connecting knobs disposed along the edge of the first-half piece to mate with at least two accommodating female connecting slots disposed along the edge of the second half-piece, said connector being designed to snap together with said connecting slots to facilitate alignment and joinder of the first half-piece with the second half-piece.

4. The seal as recited in claim 2, wherein the edge and male connecting knobs of the first half-piece and the edge and female connecting slots of the second half-piece further engage each other along an edge of the disc by an interface of a first lip disposed along the edge and connecting interface of the first half-piece and a second lip disposed along an edge and connecting interface of the second half-piece, said first lip and said second lip being designed to overlap with each other when the first half-piece and the second half-piece are snapped together to further seal out contaminants by preventing infiltration along the part line where the two half-piece fit together.

5. The seal as recited in claim 1, wherein the disc and the attached porous ring are divided along at least one part line of the disc to form a first sector portion and a second sector portion, the first sector portion and the second sector portion having opposing radial edges wherein the first sector portion and the second sector portion are aligned and joined together by a connector disposed along the radial edges of the first sector portion and the opposing radial edges of the second sector portion, the first sector portion and the second sector portion comprising two nonsymmetrical portions of the disc.

6. The seal as recited in claim 5, wherein the connector is a dovetail joint comprise at least two male connecting knobs disposed along the radial edge of the first sector portion to mate with at least two accommodating female connecting slots disposed along the radial edge of the second sector portion, said connector being designed to snap together to facilitate alignment and joinder of the first sector portion with the second sector portion.

7. The seal as recited in claim 1, wherein the resilient material is a rigid thermoplastic polymer.

8. The seal as recited in claim 1, wherein the porous material is adhesively attached to the seal with a silicone elastomeric sealant.

9. The seal as recited in claim 1, wherein the porous material is felt.

10. The seal as recited in claim 1, wherein the seal is adhesively attached to the end cap of the idler roll with a silicone elastomeric sealant.

11. A conveyer idler roll comprising:
a rotatable cylinder comprising opposed ends;
an end cap over each of the opposed ends of the cylinder, the end cap comprising a circumferential opening;
a fixed axle extending through the cylinder and the end cap openings about which the cylinder rotates;
at least one bearing positioned inside the cylinder to support the cylinder about the fixed axle as the cylinder rotates;
a seal for preventing contaminants from infiltrating and fouling the idler roll, the seal further comprising
a disc of resilient material attachable to an end cap of the idler roll, the disc comprising a top face, a bottom face, and a circular aperture through the center thereof, the aperture being at least large enough to permit the disc to freely rotate about a fixed axle of the idler roll when the disc is attached to the end cap of the idler roll, the disc further comprising a raised rim located around the periphery of the bottom face of the disc to provide a surface for attaching the disc to the end cap of the idler roll; and
at least one ring of porous material attached to the bottom face of the disc circumferentially to the aperture to filter out contaminants by providing the seal with a snug fit against the end cap of the idler roll when the seal is attached thereto;
wherein the seal is formed of two semicircular half-pieces, a first half piece mated to a second half piece with a joint along a diametral interface, with said seal being attached to a least one end cap of the idler roll.

12. The conveyer idler roll of claim 11 wherein the seal is attached to at least one end cap of the idler roll.

13. The conveyer idler roll as recited in claim 11, wherein said seal is adhesively attached to the end cap of the idler roll.

14. A conveyer idler roll comprising:
a rotatable cylinder comprising opposed ends;
an end cap over each of the opposed ends of the cylinder, the end cap comprising a circumferential opening;
a fixed axle extending through the cylinder and the end cap openings about which the cylinder rotates;
at least one bearing positioned inside the cylinder to support the cylinder about the fixed axle as the cylinder rotates;
a first seal for preventing contaminants from infiltrating and fouling the idler roller selected from the group consisting of labyrinth seals and contact seals;
a second seal for preventing contaminants from infiltrating and fouling the idler roll through a circumferential gap located at an interface between the axle and a typically stationary outer first contact seal and the end cap aperture, the second seal further comprising
a disc of resilient material attachable to an end cap of the idler roll, the disc comprising a top face, a bottom face, and a circular aperture through the center thereof, the aperture being at least large enough to permit the disc to freely rotate about a fixed axle of the idler roll when the disc is attached to the end cap of the idler roll, the disc further comprising a raised rim located around the periphery of the bottom face of the disc to provide a surface for attaching the disc to the end cap of the idler roll; and
at least one ring of porous material attached to the bottom face of the disc circumferentially to the aperture to filter out contaminants by providing the seal with a snug fit against the end cap of the idler roll when the seal is attached thereto;
wherein the disc and the attached porous ring are divided along a part line of the disc to form two substantially semicircular half-pieces comprising a first half-piece comprising a diametral edge and a second half-piece comprising a diametral edge opposing the diametral edge of the first half-piece.

15. The seal as recited in claim 14, wherein the first half-piece is aligned and joined together with the second half-piece by a connector disposed along the diametral edge of the first half-piece and the diametral edge of the opposing second half-piece.

16. The seal as recited in claim 15, wherein the connector comprises a dovetail joint, the dovetail joint comprising at least two male connecting knobs disposed along the edge of the first-half piece to mate with at least two accommodating female connecting slots disposed along the edge of the second half-piece, said connector being designed to snap together with said connecting slots to facilitate alignment and joinder of the first half-piece with the second half-piece.

* * * * *